US009304744B2

(12) United States Patent
Repenning

(10) Patent No.: US 9,304,744 B2
(45) Date of Patent: *Apr. 5, 2016

(54) CONVERSATIONAL PROGRAMMING

(71) Applicant: AgentSheets, Inc., Boulder, CO (US)

(72) Inventor: Alexander Repenning, Boulder, CO (US)

(73) Assignee: AGENTSHEETS, INC., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/172,717

(22) Filed: Feb. 4, 2014

(65) Prior Publication Data

US 2014/0157233 A1 Jun. 5, 2014

Related U.S. Application Data

(63) Continuation of application No. 13/012,465, filed on Jan. 24, 2011, now Pat. No. 8,645,914.

(60) Provisional application No. 61/297,701, filed on Jan. 22, 2010.

(51) Int. Cl.
*G06F 9/44* (2006.01)
*G06F 9/45* (2006.01)
*G06F 11/36* (2006.01)

(52) U.S. Cl.
CPC .. *G06F 8/34* (2013.01); *G06F 8/20* (2013.01); *G06F 8/436* (2013.01); *G06F 11/3664* (2013.01); *G06F 8/38* (2013.01)

(58) Field of Classification Search
CPC ......... G06F 8/33–8/36; G06F 9/4425–9/4428; G06F 8/436; G06F 11/3664; G06F 8/38; G06F 8/20
See application file for complete search history.

(56) References Cited

U.S. PATENT DOCUMENTS 6,536,037 B1 * 3/2003 Guheen .................... G06F 8/71
703/2
6,618,856 B2 9/2003 Coburn et al.
(Continued)

OTHER PUBLICATIONS

Ricarose Vallarta Roque, OpenBlocks: An Extendable Framework for Graphical Block Programming Systems, 2007, pp. 1-61.*

(Continued)

*Primary Examiner* — Thuy Dao
*Assistant Examiner* — Mongbao Nguyen
(74) *Attorney, Agent, or Firm* — Hamilton, DeSanctis & Cha LLP

(57) ABSTRACT

Methods and systems for providing rich semantic feedback to programmers by executing programs, or parts of programs, in data contexts relevant to the programmer are provided. According to one embodiment, software code associated with one or more of multiple programming building blocks is enabled to be concurrently edited and executed within a programming environment. A conversational programming agent of the programming environment receives (i) information regarding the programming building blocks and (ii) information indicative of a current situation relating to the programming building blocks. The conversational programming agent evaluates the programming building blocks based on the current situation. Then, detection of one or more logical errors in one or more of the programming building blocks is facilitated by the conversational programming agent proactively providing semantic feedback regarding those of the programming building blocks to which the current situation is relevant to the programmer based on results of the evaluation.

18 Claims, 10 Drawing Sheets

(56) References Cited

U.S. PATENT DOCUMENTS

| | | | |
|---|---|---|---|
| 7,653,896 B2 | 1/2010 | Herdeg | |
| 7,752,607 B2 | 7/2010 | Larab et al. | |
| 7,849,440 B1* | 12/2010 | Englehart | G06F 8/34 715/762 |
| 7,895,579 B2 | 2/2011 | Guerrera et al. | |
| 7,913,231 B2 | 3/2011 | Stienhans et al. | |
| 8,234,630 B2 | 7/2012 | Raghavan et al. | |
| 8,381,197 B2 | 2/2013 | Meenakshisundaram et al. | |
| 8,589,886 B2* | 11/2013 | Lavie et al. | 717/124 |
| 8,645,914 B2 | 2/2014 | Repenning | |
| 8,711,161 B1* | 4/2014 | Scotzniovsky | G01R 31/318544 345/531 |
| 2005/0044527 A1* | 2/2005 | Recinto | G06F 8/36 717/109 |
| 2005/0108682 A1* | 5/2005 | Piehler | G06F 8/33 717/110 |
| 2005/0216888 A1 | 9/2005 | Drummond et al. | |
| 2005/0229154 A1* | 10/2005 | Hiew | G06F 8/34 717/110 |
| 2006/0136863 A1* | 6/2006 | Szpak | G06F 8/34 717/104 |
| 2007/0043574 A1 | 2/2007 | Coffman et al. | |
| 2007/0168932 A1* | 7/2007 | Seeger | G06F 8/34 717/105 |
| 2007/0234121 A1* | 10/2007 | He et al. | 714/33 |
| 2007/0240102 A1* | 10/2007 | Bello | G06F 8/36 717/104 |
| 2007/0245319 A1* | 10/2007 | Muenkel | G06F 8/34 717/136 |
| 2007/0277151 A1 | 11/2007 | Brunel et al. | |
| 2007/0288887 A1* | 12/2007 | Pepin | G06F 8/24 717/105 |
| 2008/0078758 A1 | 4/2008 | Shimura et al. | |
| 2008/0092111 A1* | 4/2008 | Kinnucan | G06F 8/10 717/105 |
| 2008/0163161 A1* | 7/2008 | Shaburov | G06F 8/34 717/105 |
| 2008/0163162 A1* | 7/2008 | Shaburov | G06F 8/34 717/105 |
| 2008/0307388 A1* | 12/2008 | Ralls et al. | 717/115 |
| 2009/0037875 A1* | 2/2009 | Jones | G06F 8/34 717/109 |
| 2009/0132993 A1* | 5/2009 | Mani | G06F 8/34 717/105 |
| 2009/0228264 A1 | 9/2009 | Williams et al. | |
| 2009/0259933 A1 | 10/2009 | Letkeman et al. | |
| 2010/0017185 A1 | 1/2010 | Bade et al. | |
| 2010/0070948 A1* | 3/2010 | Rama | G06F 8/72 717/105 |
| 2010/0083226 A1 | 4/2010 | Kowal | |
| 2010/0131916 A1* | 5/2010 | Prigge | G06F 8/10 717/104 |
| 2011/0047528 A1 | 2/2011 | Blanchard et al. | |
| 2011/0185343 A1 | 7/2011 | Repenning | |
| 2012/0226150 A1* | 9/2012 | Balicki et al. | 600/424 |
| 2014/0059512 A1* | 2/2014 | Brown | G06F 8/00 717/100 |

OTHER PUBLICATIONS

Tapani Raiko, Building Blocks for Variational Bayesian Learning of Latent Variable Models, 2007, pp. 1-47.*

Gahgene Gweon, Evaluating the Effect of Feedback from a CSCL Problem Solving Environment on Learning, Interaction, and Perceived Interdependence, 2007, pp. 1-10.*

Vidar Slatten, Automatic Detection and Correction of Flaws in Service Specifications, 2008, pp. 79-105.*

Catherina R. Burghart, Cognition-Oriented Building Blocks of Future Benchmark Scenarios for Humanoid Home Robots, 2007, pp. 1-7.*

Notice of Allowance for U.S. Appl. No. 13/012,465 mailed Oct. 25, 2013.

Non-Final Rejection for U.S. Appl. No. 13/012,465 mailed Apr. 17, 2013.

Thomas Biskup, Building Blocks of a Semantic Web Framework—Requirements Analysis and Architectural Implications, 2004, pp. 1-4.

Shangzhu Wang, Architectural Building Blocks for Plug-and-Play System Design, 2006, pp. 102-109.

Utimax, Conversational Part Programming Manual, Utimax 4 Dual Screen and Max Consoles for Hurco Machining Centers, 2002, pp. 3-14.

* cited by examiner

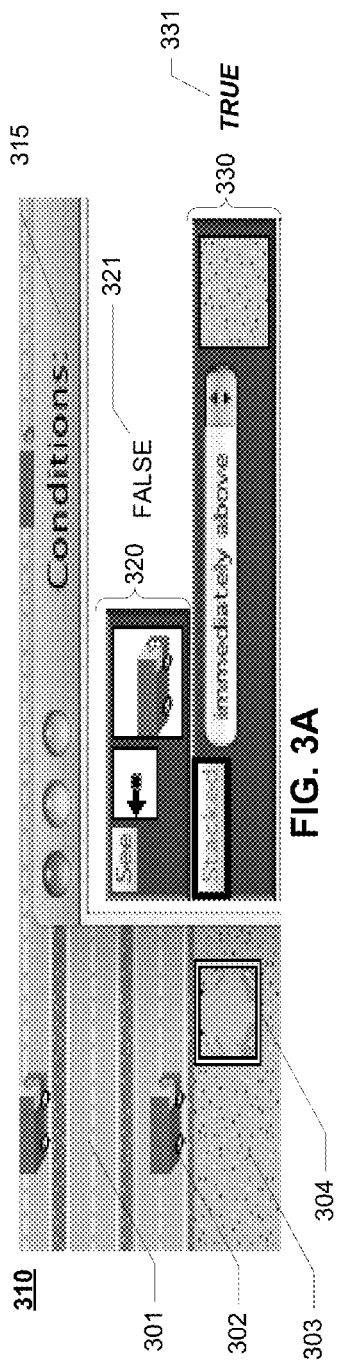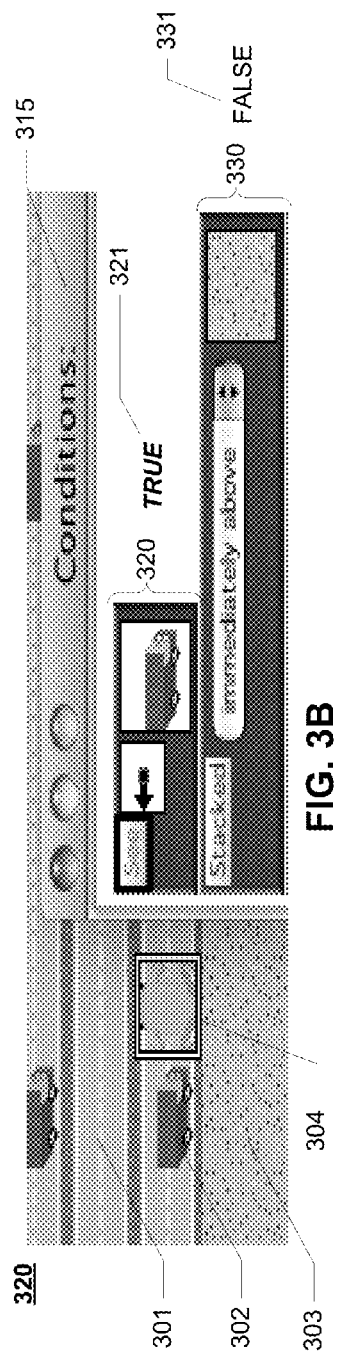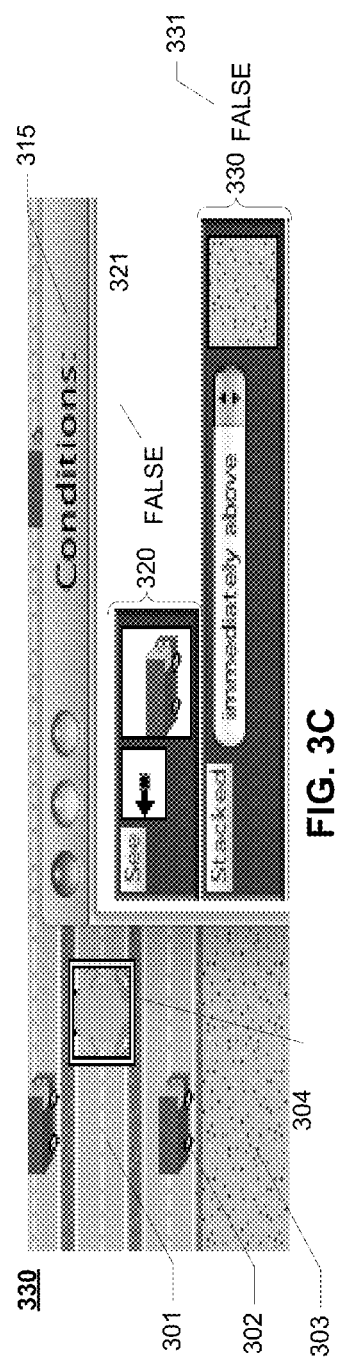
FIG. 3A
FIG. 3B
FIG. 3C

CONVERSATIONAL PROGRAMMING

CROSS-REFERENCE TO RELATED APPLICATIONS

This application is a continuation of U.S. patent application Ser. No. 13/012,465, filed Jan. 24, 2011, now U.S. Pat. No. 8,645,914, which claims the benefit of priority to U.S. Provisional Patent Application No. 61/297,701, filed on Jan. 22, 2010, both of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2010-2014, AgentSheets, Inc.

BACKGROUND

1. Field

Embodiments of the present invention relate generally to computer programming, game design and computational thinking. More particularly, embodiments of the present invention relate to methods of providing rich semantic feedback to programmers by evaluating rules in a behavior editor responsive to hypothetical situations and/or executing programs, or parts of programs, in data contexts relevant to the programmer.

2. Description of the Related Art

Programming is generally considered a difficult intellectual pursuit. The notion of programming precedes modern computers, but computers are the main devices used to design, build and maintain programs. Computers have not only steadily become more powerful from a mere computational cycles point of view, but over time they have also introduced and improved new affordances relevant to programming, such as computer graphics, often used in visual programming, or new kinds of interface devices, such as the mouse, to enable more effective means of program composition, such as drag and drop interfaces. Naturally, most of these efforts have focused on the most urgent problems in programming. Especially syntactic concerns have, in the early days of programming, and still today represented a difficult obstacle to overcome for beginning programmers.

FIG. 1 conceptually illustrates the highly asymmetrical conversation between a programmer 100 and a programming environment 130 in the context of traditional programming. Communication between programmer 100 and programming environment 130 is typically highly asymmetrical and limited to syntactic feedback 110 of limited usefulness. Syntactic feedback 110 is limited in nature to programs (e.g., program 140) that are malformed. If one excludes one semicolon in a C program, the program may not work at all. Over time, programming environments (e.g., programming environment 130) have improved by integrating a number of tools that seek to help reduce problems stemming from syntactic issues. However, even modern integrated programming environments, such as Eclipse, Xcode or Visual Studio largely follow the model of FIG. 1 by providing a highly asymmetrical conversation of limited usefulness.

This highly asymmetrical conversation is based on a long history of programming research and represents a crucial step in the right direction. Some of the first programming environments hardly included any kind of meaningful feedback turning the process of programming into a monologue. For example, early programmers had to enter a complete program without any kind of syntactic feedback. Then, when trying to run or compile the program, the programmer would see that the program did not work or, in the best case scenario, get some error message from the compiler. The main problem with such programming was recognized early on. Researchers trying to create programming environments then created systems that would provide earlier and more meaningful feedback. By 1967, the Dialog system employed input/output devices that were many years ahead of its time and provided almost instant feedback to the programmer after each character was input in a way similar to modern symbol completion found in Integrated Development Environments such as the symbol completion on Lisp machines, or intellisense of Visual Studio and similar environments including Eclipse, and Xcode. All of these environments analyze text input and help the programmer by either popping up valid completion menus or a constrained set of characters and symbols on a virtual keyboard.

A very different approach but with similar results can be found in the field of visual programming. Instead of typing in text-based instructions many visual programming languages are based on the composition of programs from basic components using mechanisms such as drag and drop. Similar to symbol completion approaches, these kinds of visual programming environments essentially attempt to prevent syntactic programming mistakes based on typos. Systems, such as AgentSheets, provide dynamic drag and drop feedback to indicate compatibility/incompatibility of some programming language building blocks while the user is trying to drag them onto targets. Other approaches experiment with puzzle piece shaped programming language building blocks to convey compatibility. More recent systems aimed at end-users, such as Scratch, use similar approaches.

While these approaches have significantly reduced syntactic problems they largely ignore the much more problematic notion of semantic feedback. The fact that a programming environment 130 provides the necessary syntactic feedback 110 (responsive to the programmer 100 editing the program 120) to help the programmer 100 create a syntactically correct program does not imply that the resulting program is meaningful or even runs at all. The asymmetry of the conversation between programmer 100 and programming environment 130 in FIG. 1 is not only intended to indicate the amount of information flowing each way but also the degree of usefulness to create a program that works and is meaningful.

Semantics is about the meaning of a program, which of course is very important. Unfortunately, existing semantic analysis is limited in usefulness because it usually separates programs from data and therefore removes important context necessary to provide truly useful feedback to the programmer. For instance, semantic analysis can reveal that a function is called with the wrong number of kind or parameters. The true meaning of calling a function with actual parameters can only be experienced when actually calling that function. Is a certain condition true, will a certain function return the right value? These kinds of questions require a deep dynamic approach including data in the analysis of semantics.

SUMMARY

Methods and systems are described for providing rich semantic feedback to programmers by executing programs, or parts of programs, in data contexts relevant to the programmer. According to one embodiment, a method is provided for communicating semantic information to a programmer. Software code associated with one or more of multiple programming building blocks is enabled to be concurrently edited and executed within a programming environment. A conversational programming agent of the programming environment receives (i) information regarding the programming building blocks and (ii) information indicative of a current situation relating to the programming building blocks. The conversational programming agent evaluates the programming building blocks based on the current situation. Then, detection of one or more logical errors in one or more of the programming building blocks is facilitated by the conversational programming agent proactively providing semantic feedback regarding those of the programming building blocks to which the current situation is relevant to the programmer based on results of the evaluation.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIGS. 3A-3C illustrate various types of reactive changes in annotations of latent programming language building blocks contained in a conditions palette in accordance with an embodiment of the present invention.

DETAILED DESCRIPTION

Figure 1:
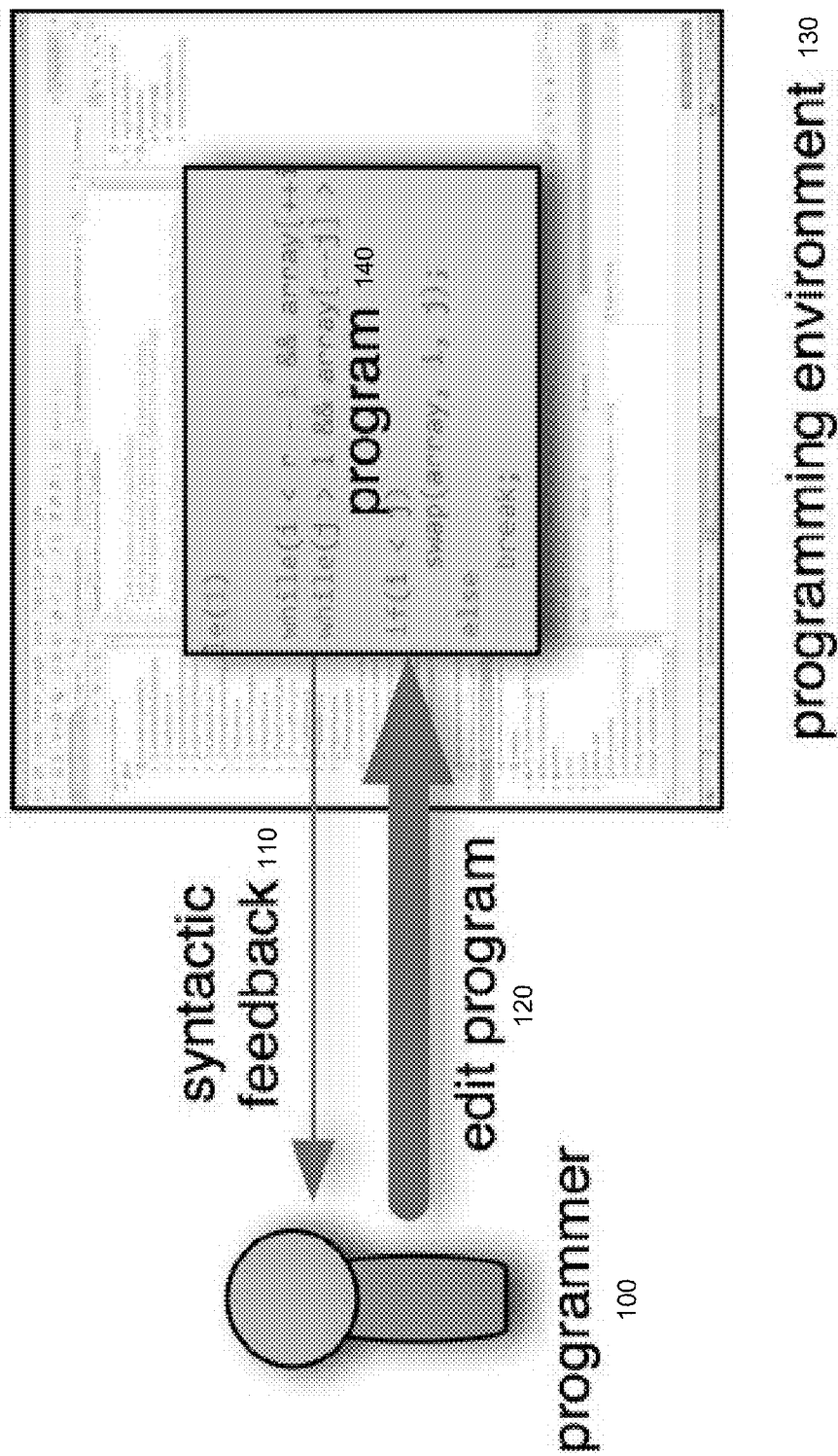
FIG. 1 conceptually illustrates the highly asymmetrical conversation between a programmer and a programming environment in the context of traditional programming.

Methods and systems are described for providing rich semantic feedback to programmers by executing programs, or parts of programs, in data contexts relevant to the programmer. According to one embodiment, conversational programming provides rich semantic feedback to programmers by evaluating rules in a behavior editor responsive to hypothetical situations and/or executing programs, or parts of programs, in data contexts relevant to the programmer. In accordance with various embodiments, a fundamental idea of conversational programming is to establish a conversation that is much more symmetrical than traditional programming environments by providing the programmer with semantic information at the right time in the right form. In its most extreme form conversational programming could be conceptualized as some kind of chatty conversational programming agent acting as a pair programming buddy by constantly running the program created by the programmer. In doing so, the conversational programming agent not only provides rich semantic information about the existing program, but may also even proactively provide information about programs or portions thereof that have not even been written by the programmer.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

While, for convenience, embodiments of the present invention are described with reference to visual programming languages and specifically with reference to AgentSheets (an agent-based simulation and game authoring tool available from AgentSheets, Inc of Boulder, Colo.), it is to be recognized that the principles of conversational programming hold true for any kind of object-oriented or agent-based computational system. Similarly, for sake of brevity and illustration, embodiments of the present invention are described with reference to colored annotations relating to evaluation of Boolean conditions; however, the present invention is equally applicable to (i) more complex output, including but not limited to numbers, strings or anything a function can return that could be presented textually or visually and (ii) alternative visual annotations, including but not limited to shape, texture, animation or other color schemes and/or use of sound or speech.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using visual programming terminology and/or modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

TERMINOLOGY

Brief definitions of terms used throughout this application are given below.

The terms "connected" or "coupled" and related terms are used in an operational sense and are not necessarily limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

The phrase "latent program" generally refers to a piece of a program including a collection of latent programming building blocks that are available to be used to compose an operational program. In some embodiments, the latent program includes palettes such as a condition palette and an action palette.

If the specification states a component or feature "may", "can", "could", or "might" be included or have a characteristic, that particular component or feature is not required to be included or have the characteristic.

The phrase "operational program" generally refers to the piece of a program that expresses the function of the project. According to embodiments of the present invention, this function may be a collection of all the behaviors expressed as methods of agent classes.

The term "program" generally refers to instructions for a computer. Programs typically have a human-readable form (e.g., source code or visual representation), from which an executable form is derived (e.g., compiled) that the computer can use directly to execute the instructions. A program can be split up into tow pieces. One called the operational program and one called the latent program.

The term "responsive" includes completely or partially responsive.

The term "semantics" generally refers to an assumed or explicit set of understandings used in a system to give meaning to data. According to one embodiment, semantic information provided to a programmer includes context-dependent (e.g., situation-dependent) information regarding the meaning of a portion of a latent or operational program. For example, colored annotations relating to evaluation of Boolean conditions associated with programming building blocks (e.g., behavior rules associated with an agent) may be provided to a programmer to illustrate to the programmer which, if any, rules contained within a behavior editor, for example, would "fire" responsive to a hypothetical situation defined by the programmer within a worksheet, for example. Alternatively, more complex output, including, but not limited to, numbers, strings or anything a function can return that could be presented textually or visually may be employed to provide semantic feedback to a programmer. For example, alternative visual annotations, including but not limited to shape, texture, animation or other color schemes and/or use of sound or speech may be used.

The term "situation" generally refers to a combination of a selection and data. In some embodiments, the selection may refer to a specific instance or instances of an agent or agents; whereas data may describe the collection of the agents. Data may manifest itself visibly to the user (e.g., position, size or shape of an agent). Alternatively, data, such as the agent attributes, may not have a visible manifestation and only becomes accessible to the user through tools, such as inspectors.

Figure 2:
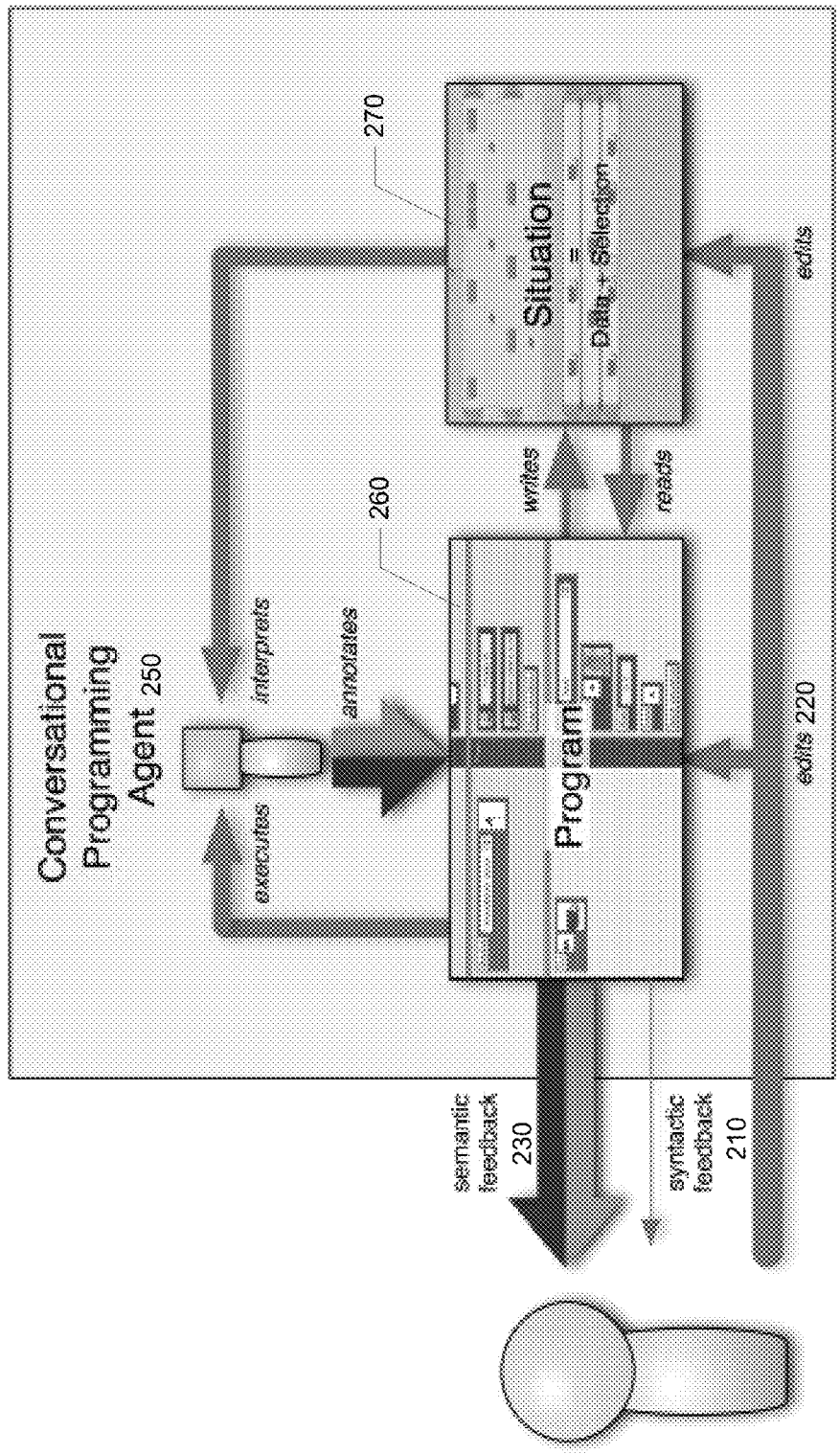
FIG. 2 conceptually illustrates the rich semantic feedback provided by a conversational programming environment according to one embodiment of the present invention.

FIG. 2 conceptually illustrates rich semantic feedback 230 provided by a conversational programming environment 240 according to one embodiment of the present invention. In the conversational programming architecture of FIG. 2, the main difference from FIG. 1 is the presence of rich semantic feedback 230, which is provided by a Conversational Programming Agent (CPA) 250. To make this kind of feedback possible, the CPA 250 executes a program 260 and is provided with access to a combination of data and a selection called a situation 270.

The notion of conversation emerges from conversation taking place between the programmer 200 and the CPA 250. Similar to a natural language conversation, it is desirable to achieve a workable balance of contributions by the participants (e.g., both the programmer 200 and the conversational programming agent 250) in the conversation. In embodiments of the present invention, the programmer 200 edits/changes 220 the program 260 and/or the situation 270. The CPA 250, in turn, executes the program 260, or selective parts of the program, in the context of the situation 270. According to one embodiment, the results of this execution are represented through annotations (not shown) in the program 260. A simple example is the execution of conditions, returning a value of either true or false. These results are used to annotate the conditions, for instance, red color may be used to indicate conditions being false and green color may be used to indicate conditions being true.

The large size of the semantic feedback 230 arrow pointing back at the programmer 200 reflects the rich nature of the conversational feedback being provided. In accordance with embodiments of the present invention, even a relatively small conversation starter, such as the programmer 200 applying a minor edit 220 to the program 260 and/or the situation 270, may result in potentially large amount of semantic feedback 230. For instance, just moving the frog in a Frogger like game a little bit may result in many annotation changes in the program 260.

Various components of the conversational programming environment architecture as depicted in FIG. 2 are described in detail below. Where necessary and for convenience, Agent-Sheets is used as an illustration to make examples more concrete (AgentSheets is an agent-based simulation and game authoring tool available from AgentSheets, Inc of Boulder, Colo.). Importantly, however, the principles of conversational programming hold true for any kind of object-oriented or agent-based computational system. Agents are autonomous types of objects that can be implemented with any object-oriented system featuring some kind threading mechanism.

According to the present example, the program 260 is split up into two pieces called the operational program (not shown) and the latent program (not shown). The operational program is the actual program expressing the function of the project. This function is a collection of all the behaviors expressed as methods of agent classes. Parts of the operational program will be executed by the Conversational Programming Agent (CPA) 250 in the context of the current situation 270. The results of these executions will be used by the CPA 250 to annotate the operational program. The latent program is a collection of latent programming building blocks which could be used to compose an operational program. In the context of AgentSheets, the latent program consists of the palettes including the condition and action palette.

The situation 270 describes the combination of data and selection. Data, similar to the notion of data in a spreadsheet, describes the collection of all agents in worksheets, called agentsheets in the context of AgentSheets. Most of the data manifests themselves visibly to the user, such as the position, size or shape an agent. Other data, such as the agent attributes, may not have a visible manifestation and only become accessible to the user through tools such as inspectors. A selection is based on zero, one or more agents designated by user for instance through a mouse click. The selection may indicate, for instance, to the inspector which agent is going to be inspected. The combination of selection and data results in a situation 270 providing the situated topic of the conversation. A selection refers to specific instances of agents, for instance, the frog in a Frogger game. The selected agent also determines the class of the selected agent, which in turn, further focuses conversational programming to the part of the main program defining the behavior of an agent. For instance, selecting the frog means that one can focus on the frog's behavior.

In embodiments of the present invention, the CPA 250 converses with the programmer 200 by annotating latent and operational programming language building blocks by executing them in the context of the current situation 270. The programmer 200 converses with the CPA 250 by changing the situation 270, e.g., editing 220 data or changing the selection, by editing/changing 220 the program 260 or by changing parameters of the programming language building blocks.

Latent programming language building blocks are building blocks that are not part of the operational program, but which could become part of the operational program through programming initiated by the programmer 200 through a compositional process such as drag and drop. All the programming language building blocks contained in the condition and action palettes of AgentSheets, for instance, are latent programming language building blocks. The conversational programming agent 250 annotates latent programming language building blocks, as described further below, indicating that certain building blocks exhibit semantic relevance to particular situations.

Operational programming language building blocks are part of the operational program. Similar to the latent programming language building blocks, the conversational programming agent 250 executes operational programming language building blocks in the context of the current situation 270 and annotates these blocks.

Examples are now provided to illustrate the function of conversational programming. Unfortunately, the intrinsically static nature of paper used to represent these examples is hard pressed to convey the intrinsically dynamic nature of conversational programming. Four main cases can be differentiated based on two fundamental attributes of conversational programming. The type of programming language building blocks is either latent or operational. The conversation taking place between the programmer 200 and the conversational programming agent 250 is either reactive or proactive. The following sections describe all four combinations of these attributes.

FIGS. 3A-3C illustrate various types of reactive changes in annotations 321 and 331 of latent programming language building blocks contained in a conditions palette 315 in accordance with an embodiment of the present invention. In the examples depicted in FIGS. 3A-3C, a Frogger-like game has been built with AgentSheets. The programmer has created a number of agents including a frog 304, trucks (e.g., truck 302), roads (e.g., road 301) and ground 303. In the present example, none of these agents have been programmed yet. Rather, in the context of FIGS. 3A-3C, the programmer has created situations 310, 320 and 330 representing the game world and has made the frog 304 to be the current selection. As such, FIG. 3A-3C show the reactive change in annotations 321 and 331 of the latent programming language building blocks contained in the AgentSheets conditions palette 315.

In FIG. 3A (situation 310), the frog 304 is about to cross the street. The first condition 320 (i.e., "see left, truck") is false. The second condition 330 (i.e., "stacked immediately above the ground") is true. Information about these conditions 320 and 330 can be conveyed to the programmer by presenting the conditions 320 and 330 in color, for example, corresponding with the Boolean value of the result 321 and 330. For example, false conditions may be presented in red and true conditions may be presented in green. Those skilled in the art will recognize various alternative mechanisms are available for visually communicating such semantic information. For example, true conditions may be presented more prominently than false conditions or true conditions may be presented in color and false conditions may be gray. Notably, while embodiments are described with reference to colored annotations 321 and 331 relating to evaluation of Boolean conditions, those skilled in the art will appreciate the broader applicability of the present invention to (i) more complex output, including but not limited to numbers, strings or anything a function can return that could be presented textually or visually and (ii) alternative visual annotations, including but not limited to shape, texture, animation or other color schemes and/or use of sound or speech as auditory annotations.

In FIG. 3B (situation 320), the frog 304 is on the street next to a truck 302. In this situation 320, the first condition 320 (i.e., "see left, truck") is true. The second condition 330 (i.e., "stacked immediately above the ground") is false. Again, information about these conditions 320 and 330 can be conveyed to the programmer by graphically presenting the evaluated conditions in a distinguishing manner in accordance with the evaluated results (e.g., Boolean value of the result 321 and 330 and/or color of conditions 320 and 330).

In FIG. 3C (situation 330), the frog 304 is on the street 301 without a truck heading towards it. In this situation 330, the first condition 320 (i.e., "see left, truck") is false. The second condition 330 (i.e., "stacked immediately above the ground") is false. Again, information about these conditions can be conveyed to the programmer by graphically presenting the evaluated conditions 320 and 330 in a distinguishing manner in accordance with the evaluated results (e.g., Boolean value of the result 321 and 330 and/or color of conditions 320 and 330).

The process used to get into a certain situation (e.g., situations 310, 320 and 330) is irrelevant in conversational programming. Perhaps the frog 304 has not yet been programmed at all, i.e., it only has empty methods, or perhaps the frog 304 does feature a simple version of a program, such as a method that will move the frog around as the result of a user pressing cursor keys. How the frog 304 got to where it is, however, is irrelevant to the semantic information (e.g., semantic feedback 230) resulting from evaluation of the situation (e.g., situations 310, 320 and 330). For example, the operational program may be running or may be stopped and the programmer simply has used the mouse to drag the frog 304 from one location to another. None of this is relevant to the conversation. The same kind of semantic feedback (e.g., Boolean value of the result 321 and 330 and/or color of conditions 320 and 330) may provided regardless of the process used to create the current situation (e.g., situations 310, 320 and 330).

While some end-user programming tools allow a programmer to test a condition of interest, conversational programming substantially improves on these prior approaches in at least two ways. Firstly, using a conversational programming approach, the programmer does not need to ask for this kind of feedback. Instead, the system reacts immediately to a change in situation (e.g., situation 270). Secondly, the programmer does not have to select a specific language building block to be evaluated. Instead, in embodiments of the present invention, all language blocks relevant to the situation may be annotated automatically by the CPA 250. At the very least, this is an improvement of efficiency. A programmer could sequentially select all the conditions in the condition palette and repeat to test; however, this could take a long time (e.g., AgentSheets include about 30 different conditions). The conversational programming agent 250, conceptually speaking, can annotate all the building blocks in parallel. This approach is not only much faster but it also increases the potential of serendipitous discovery. After all, a programmer may not even be aware that a certain programming language building block exists, or that it includes relevant semantics. Based on timing alone, the ability to quickly change the situation (e.g., situation 270) and to almost immediately perceive semantic consequences could result in the perception of causality in a way that would not be possible with previous mechanisms.

Unlike the reactive version of conversational programming, proactive conversations do not have to wait for some kind of stimulus by the programmer. That is, the situation (e.g., situation 270) may not change and the program (e.g., program 260) may remain the same, but time advances. The proactive nature of conversational programming enables a different kind of autonomy where the conversational programming agent 250 can, at any point in time, initiate a conversation to convey potentially important information. For instance, AgentSheets includes a number of temporal and probabilistic language building blocks which benefit from conversational programming treatment.

As one example of a temporal language building block in the context of AgentSheets, the "OnceEvery" condition provides a means to access timers. A condition may be specified in such a manner as to be true only once every 1.0 seconds, for example. The conversational programming process can make the OnceEvery condition blink at the frequency expressed by the time parameter. In this manner, a programmer is able to experience the function of the OnceEvery command dynamically including its frequency in way that is very different from accessing static media such as tool tips. Moreover, this means of communicating semantics includes concrete values. For instance, if the time parameter of OnceEvery is 0.5 instead of 1.0 the programmer would "see" that the condition is true at a frequency twice as large as with 1.0. Even if the parameter is an expression instead of just a constant value, the programmer would be able to experience the value of that expression.

As one example of a probabilistic language building block in the context of AgentSheets, a "% Chance" condition will be true or false based on the probability specified by its parameter. Conversational programming can be used to communicate that probability through proactive annotation of the condition. For instance, a 50% chance condition can be displayed so as to flicker in a way being green or red at a 50/50 percent distribution. A high probability of, say, 95% can result in a % chance condition mostly being green, whereas, a low probably of, say, 5% will be displayed red most of the time.

Figure 4:
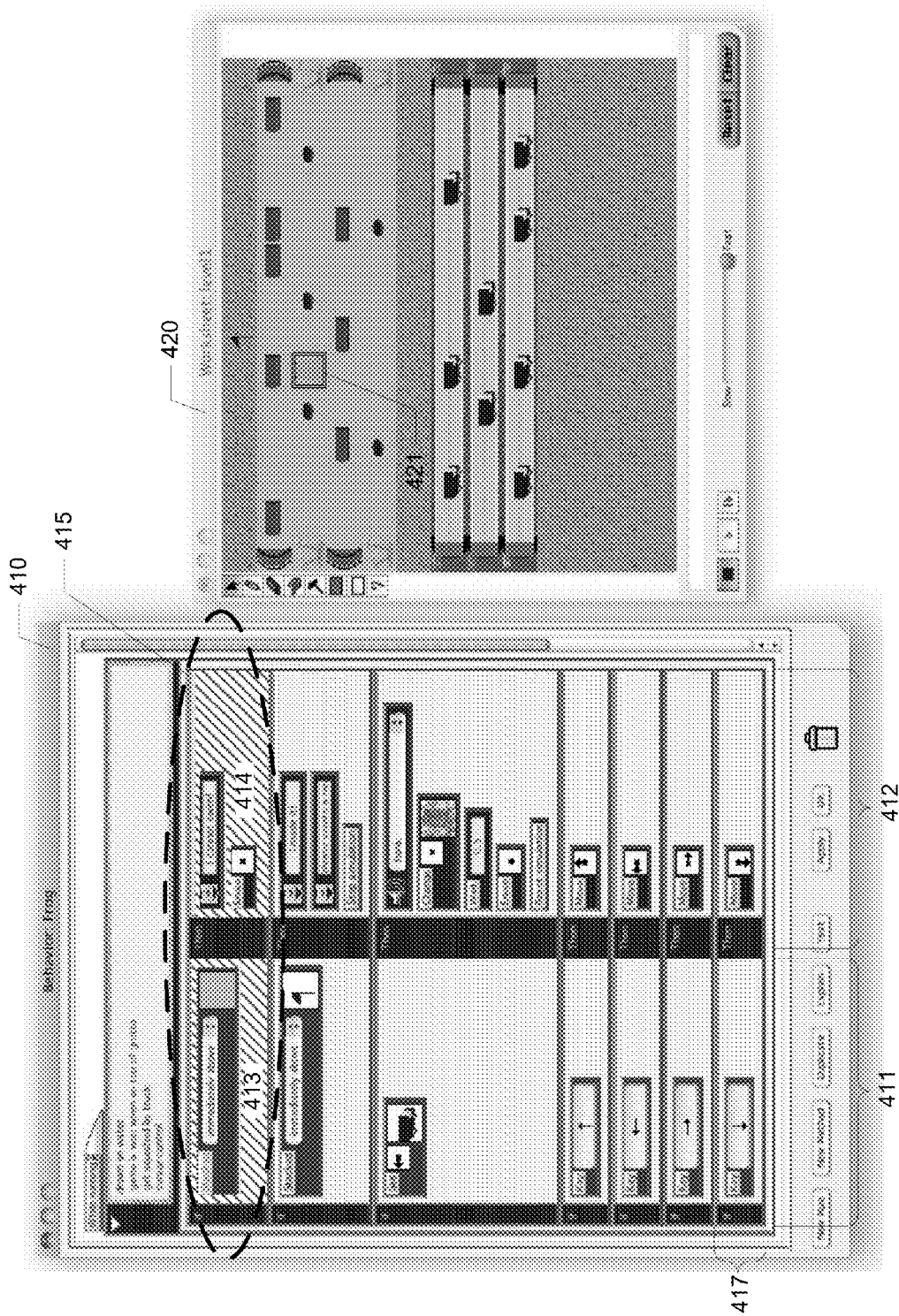
FIGS. 4-5 illustrates evaluation of rules in a behavior editor responsive to hypothetical situations depicted in a worksheet in accordance with an embodiment of the present invention.
Figure 5:
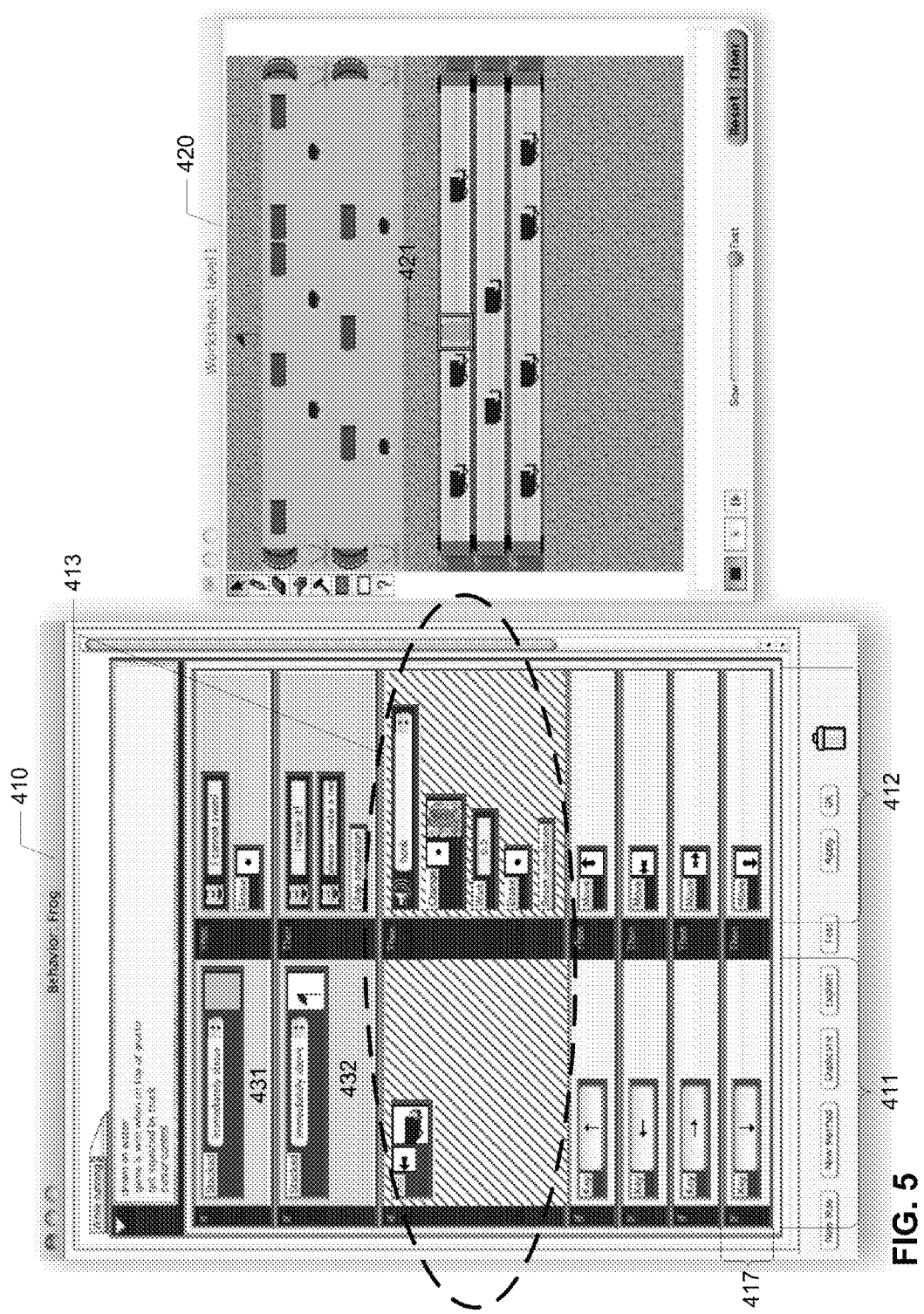

FIGS. 4-5 illustrates evaluation of rules 415 in a behavior editor 410 responsive to hypothetical situations depicted in a worksheet 420 in accordance with an embodiment of the present invention. As indicated above, operational programming language building blocks are part of the main operational program. In AgentSheets, and most object-oriented frameworks, they are contained in methods which are associated with classes. Like their latent counterparts, operational programming language blocks participate in the conversational programming process by constantly being evaluated and the results of that evaluation are used to annotate the building block. However, because these building blocks are part of more complex program structures and not just an independent collection of building blocks, such as the ones in a palette, the consequence of evaluating these operational programming language building blocks can be traced further. For instance, if a condition is found to be false, then one can analyze parts of the program containing the condition. If the condition is part of some complex IF-THEN or CASE expression, one can annotate all consequences of conditions being true or false.

In FIG. 4, the behavior of the frog 421 is represented in Visual AgenTalk rules (e.g., rule 415), which in most traditional languages, such as Java would be IF <conditions>, THEN <actions> ELSE IF <conditions> THEN <actions>, ELSE IF <conditions> THEN <actions>, . . . . According to the present example, each rule (e.g., rule 417) has one or more conditions 411 and one or more actions 412.

Notice in the agentsheet, called "Worksheet: level1" (FIG. 4, right) the frog 421 is selected. In this situation, the frog 421 is on top of water, which, according to the original game play description of Frogger is bad news for the frog 421 as it cannot swim. The first rule 415 of the behavior editor 410 (FIG. 4, left) has a Stacked condition 413, which is true because the frog is indeed "immediately above" water. Not only may the condition 413, the programming language building block, be annotated in green, for example, to indicate that the condition 413 is true, but the entire first rule 415 may feature a green background, for example. The meaning is that all of the conditions of this rule 415 (just one in this case—condition 413) are true so that the rule could "fire" by executing all its actions (e.g., action 414).

According to embodiments of the present invention, conversational programming does not cause side effects. The combination of worksheet 420 and behavior editor 410 interact such that in the current situation the first rule 415 would fire causing the frog 421 to perform the corresponding actions 414 (i.e., say that it cannot swim and then disappear). Importantly, this is not some kind of runtime tracing tool visualizing the execution of the program. In the context of the present example, conversational programming only shows that in the current situation the frog 421 would drown, but does not actually drown it. This is part of a conversation about a hypothetical situation that the user is playing around with or testing without running the main program. Of course, the programmer can run the main program which would cause the frog to drown.

Other rules including their conditions are not annotated in the present example because the particular rule semantics of AgentSheets is that: all rules are tested from top to bottom; the first rule 417 with all its conditions 411 being true will fire; rules following the rule that is firing will not be tested. The annotation in FIG. 4 stops at the first rule because of this.

In FIG. 5, the situation is changed by moving the frog 421 down to the road in front of a truck. Once again, the situation for the frog 421 looks bleak. Now, the annotation may tell a different story, for example, by coloring rule 413 green. Rule evaluation, again, is handled top to bottom. The frog 421 is NOT stacked above water, therefore the first rule 431 fails. The frog is not stacked on top of the ground either, therefore the second rule 432 also fails. However, the frog 421 does see, to its left, a truck. Thus, the third rule 413 does fire, a sound is played, the frog 421 turns into a crushed looking frog and after some brief delay the frog disappears and the simulation is reset.

Figure 6:
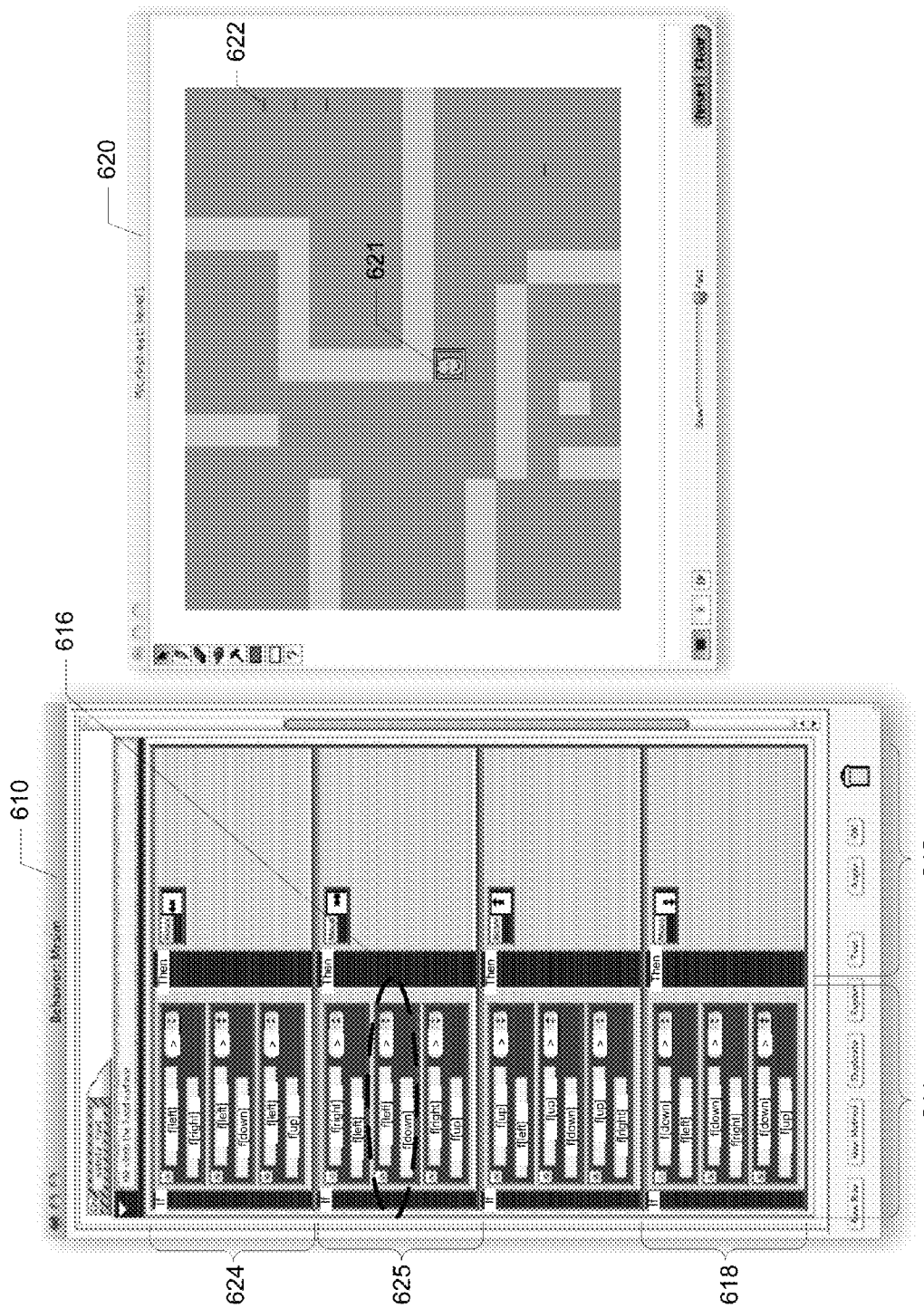
FIG. 6 illustrates how conversational programming may assist in connection with finding programming bugs in accordance with an embodiment of the present invention.

FIG. 6 illustrates how conversational programming may assist in connection with finding programming bugs in accordance with an embodiment of the present invention. Conversational programming is useful to find programming bugs. The previous examples are mostly showing what well designed programs would do if they were run, but in many cases one wishes to investigate why an existing program is not working. FIG. 6 shows a Sims-like game in which various signals, such as food 622 and social values (not shown), are diffused as complex landscapes over the worksheet 620.

As in the examples described above, according to the present example, each rule (e.g., rule 618) in behavior editor 610 has one or more conditions 611 and one or more actions 612.

The selected agent 621 in FIG. 6 is trying to find the food 622, but is stuck in a maze. Looking at the situation suggest that the agent 621 should be moving to the right, towards the hamburger 622, but the rule 625 responsible for moving to the right does not fire. In this example, the method containing the rule 625 is a hill climbing method making the agent 621 look at its four immediate neighbors, comparing their values and finally moving in the direction of maximal value.

Even without looking at the precise expressions used in the conditions of the hill climbing method, one can find that the second condition 616 of the rule 625 that would make the agent go to the right is false (and may be annotated by coloring the entire rule, the condition 616 and/or the actions red). Closer inspection reveals that the second condition 616 is incorrectly (accidentally) comparing the value of the left neighbor with the value of the down neighbor instead of comparing the value of the right neighbor with the value of the down neighbor. This could have easily been the result of copying the first rule 624. The semantic feedback provided by conversational programming helps to quickly focus the investigation on the faulty condition which is likely to simplify the debugging process.

Figure 7A:
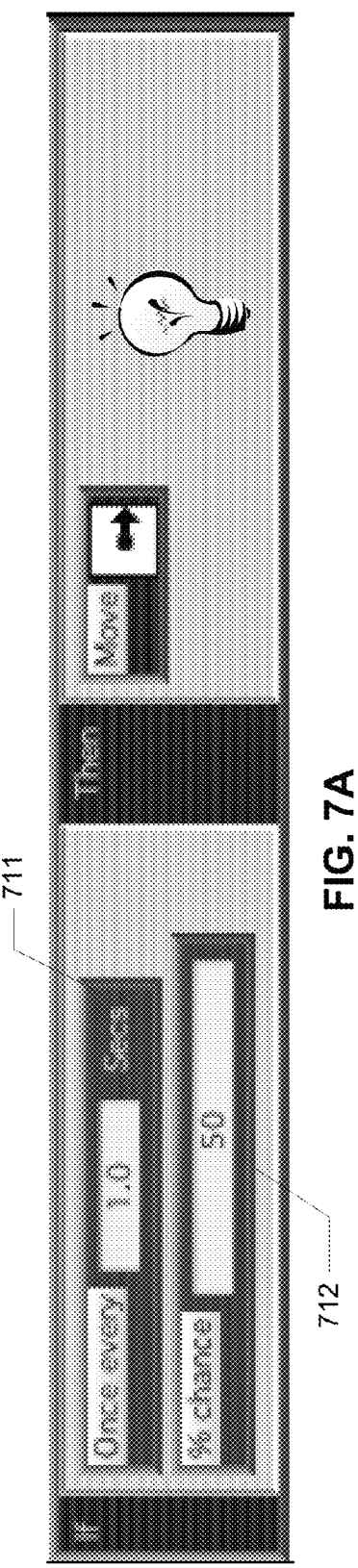
FIGS. 7A-7B illustrates how operational blocks can be annotated proactively in accordance with an embodiment of the present invention.
Figure 7B:
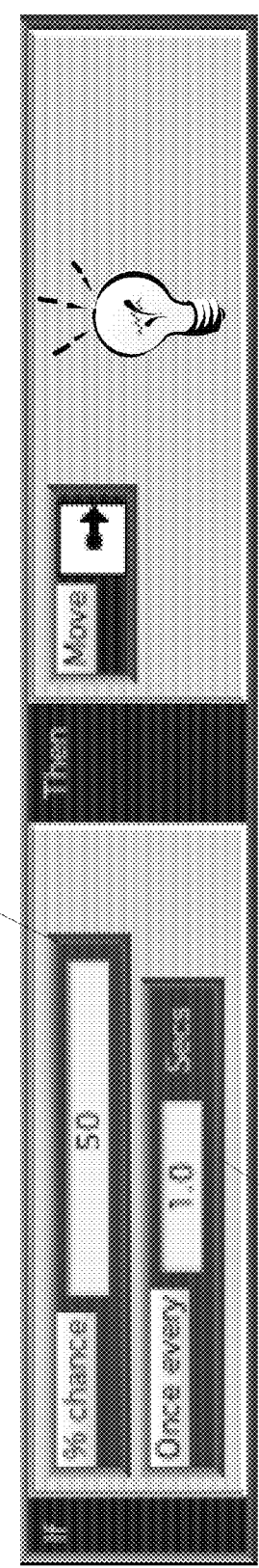

FIGS. 7A-7B illustrates how operational blocks 730 and 740 can be annotated proactively in accordance with an embodiment of the present invention. Just like latent programming language building blocks, operational blocks (e.g., 730 and 740) can be annotated proactively. In other words, there is no need for a programmer to produce a new stimulus in order to receive a new response (updated semantic information from the conversational programming environment). Proactive conversations can be instrumental in conveying difficult semantics especially when connected to temporal and probabilistic matters. For instance, the consequences of order of execution especially in conditional expressions is notoriously difficult to understand for beginning programmers and sometimes even for experienced programmers.

In a first rule 730 depicted in FIG. 7A, two conditions 711 and 712 are employed to make an agent move. Let's assume that the rule 730 is being evaluated at high frequency. For instance, in a video game it would be common to execute some object behavioral scripts at the same frequency as the game is rendered graphically, e.g., 60 frames per second. The first rule 730 would first test the OnceEvery (1.0) second condition 711 60 times per second, which would be true only once per second. Thus, the second condition 712, the % chance (50) condition, would be tested only once per second resulting in the rule 730 only firing once every other second. A programmer may be alerted to this by, for example, the entire rule 730 flashing green at a rate of once every two seconds.

The second rule 740 depicted in FIG. 7B would behave very differently. Its first condition 721, the % chance (50) condition, assuming it is evaluated 60 times per second, would be true on average roughly 30 times per second. If and only if the % chance condition 721 is true, the system would test the second condition 722, i.e., the OnceEvery (1.0) timer condition. This condition 722 is only true once per second. Being tested at about 30 times per second, the rule 740 would fire once per second. A programmer would be alerted to this, for example, by the entire rule 740 flashing green at this much higher frequency—once per second.

Figure 8:
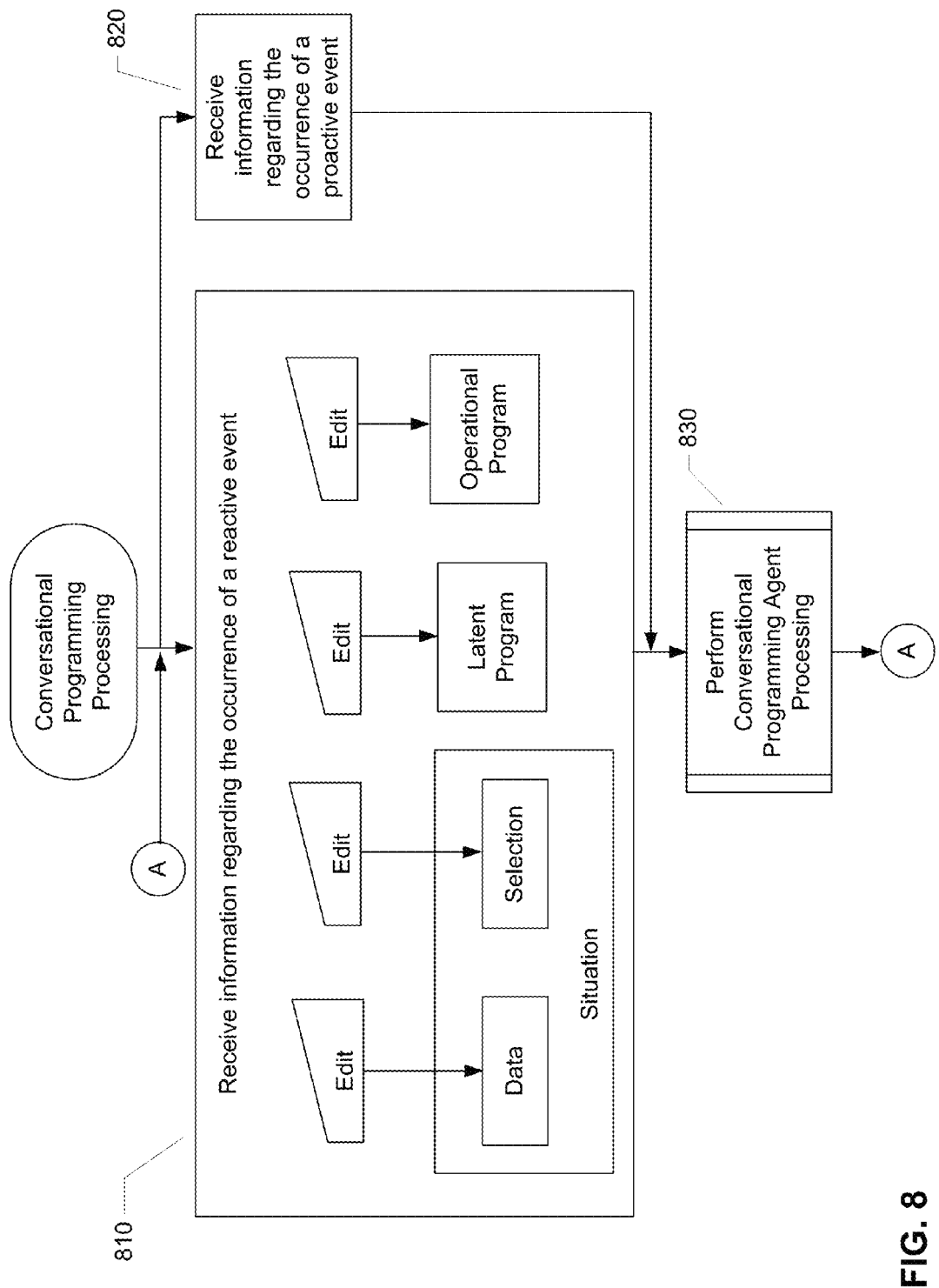
FIG. 8 is a flow diagram illustrating a high-level conversational programming process in accordance with an embodiment of the present invention.

FIG. 8 is a flow diagram illustrating a high-level conversational programming process in accordance with an embodiment of the present invention. In the present example, the conversational programming process begins by receiving either information regarding the occurrence of a reactive event (block 810) or information regarding the occurrence of a proactive event (block 820). In one embodiment, the reactive event may represent one or more of (i) editing of a situation (either the data or the selection) by an end user (e.g., a programmer); (ii) editing of one or more latent programming building blocks of a latent program; and (iii) editing of one or more operational programming building blocks of an operational program. The proactive event, may represent one or more types of events that do not require stimulus by the end user. Examples of proactive events include, but are not limited to, periodic evaluation of conditions relating to probability (e.g., % chance conditions) or conditions relating to time (e.g., OnceEvery conditions).

Responsive to receiving information regarding the occurrence of a reactive event or a proactive event, at block 830, conversational programming agent processing is performed. According to one embodiment, a conversational programming agent of a conversational programming environment has access to both programming building blocks (including latent and operational programming building blocks) and context provided by way of a situation, including data and selection information. As such, the conversational programming agent may interpret the situation and provide semantic feedback to the end user by executing/evaluating relevant programming building blocks of a latent or operational program and appropriately annotating the relevant programming building blocks based on the results of the evaluation.

Figure 9:
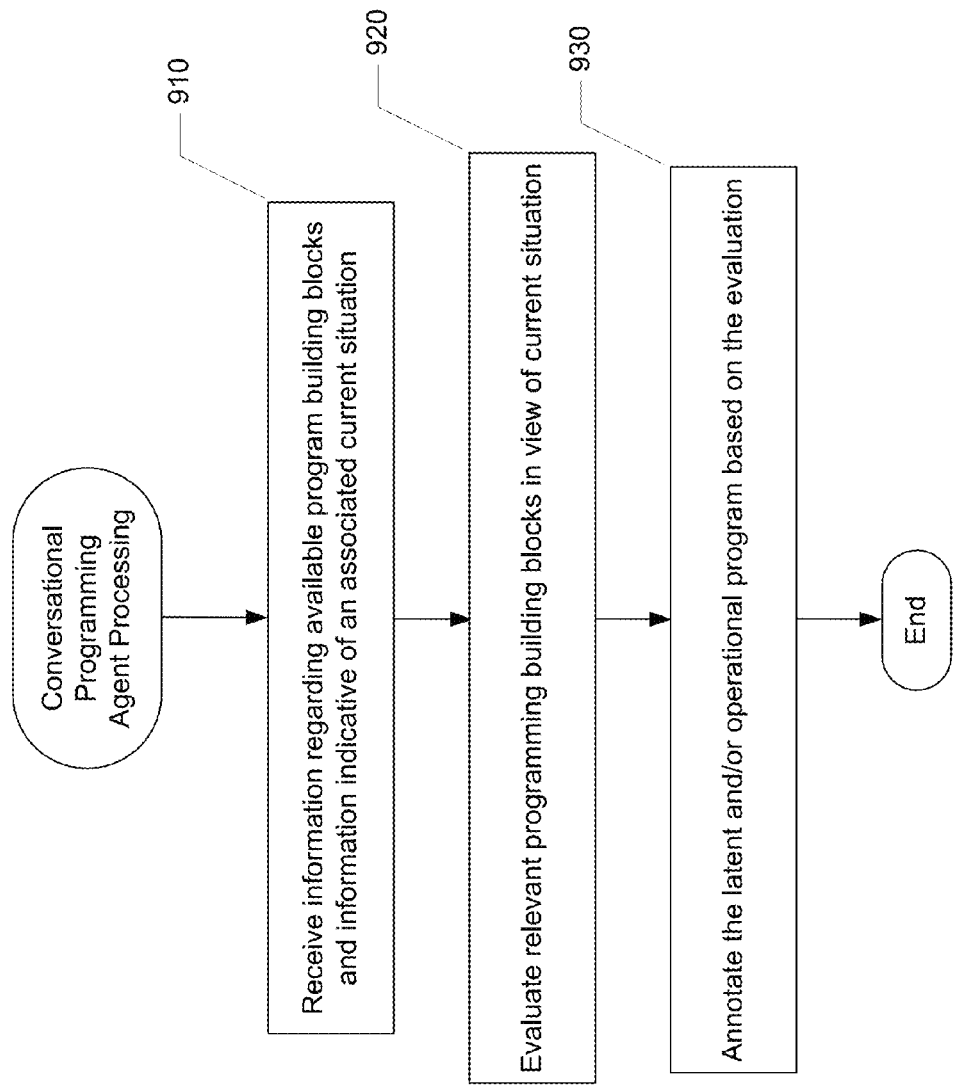
FIG. 9 is a flow diagram illustrating conversational programming agent processing in accordance with an embodiment of the present invention.

FIG. 9 is a flow diagram illustrating conversational programming agent processing in accordance with an embodiment of the present invention. According to the present example, conversational programming agent processing begins with block 910. At block 910, a conversational programming agent of a conversational programming environment receives information regarding available program building blocks and information indicative of an associated current situation.

In one embodiment, the available program building blocks include latent programming building blocks and/or operational programming building blocks. In the context of a program that is yet to be completed or an agent having empty methods, incomplete methods or simplified methods, a programmer may experiment with different hypothetical situations within a conditions palette containing one or more conditions under test. In some embodiments, the conversational programming agent identifies relevant programming building blocks based on a selection associated with the current situation. For example, in FIGS. 3A-3C, the frog 304 represents the selected agent. As such, the conversational programming agent may identify rules associated with the frog agent as those to be evaluated and annotated.

At block 920, the conversational programming agent evaluates the relevant programming building blocks in view of the current situation. According to one embodiment, evaluating the programming building blocks involves interpreting the data and selection associated with the situation established by the end user and evaluating one or more functions or conditions of rules based on the current situation. As noted above with reference to FIGS. 4 and 5, evaluation of relevant programming building blocks may involve evaluating conditions within a behavior editor based on a situation represented within a worksheet.

In one embodiment, the end user may enable or disable evaluation of latent programming building blocks and thus removing them from the set of relevant programming building blocks. In other embodiments, the conversational programming agent may perform a relevance assessment with respect to one or both of latent and operational programming building blocks to determine which are to be evaluated. As indicated above, for example, when the frog is the selected agent in the situation, the conversational programming agent may infer that the end user would like semantic feedback regarding rules associated with the frog agent. In other embodiments, rules associated with all agents involved in the situation may be evaluated.

At block 930, the latent and/or operational program is annotated based on results of the evaluation. In one embodiment, rules within a behavior editor, for example, that would "fire" in the context of the situation represented within a worksheet, for example, may be annotated by presenting them with a colored, e.g., green background. Alternatively, the output of a function (e.g., a Boolean condition) can be provided proximate to the rule or condition in the behavior editor. Similarly, conditions evaluating to true could be visually depicted in one manner and Boolean conditions evaluating to false could be visually depicted in another manner to allow the end user to distinguish among them.

As noted above, more complex annotation output is contemplated. For example, numbers, strings or anything a function can return that could be presented textually or visually could be displayed proximate to the rule or condition at issue. Various other visual annotations, including but not limited to shape, texture, animation or other color schemes and/or use of sound or speech as auditory annotations may also be used alone or in combination with other annotation mechanisms described herein.

Figure 10:
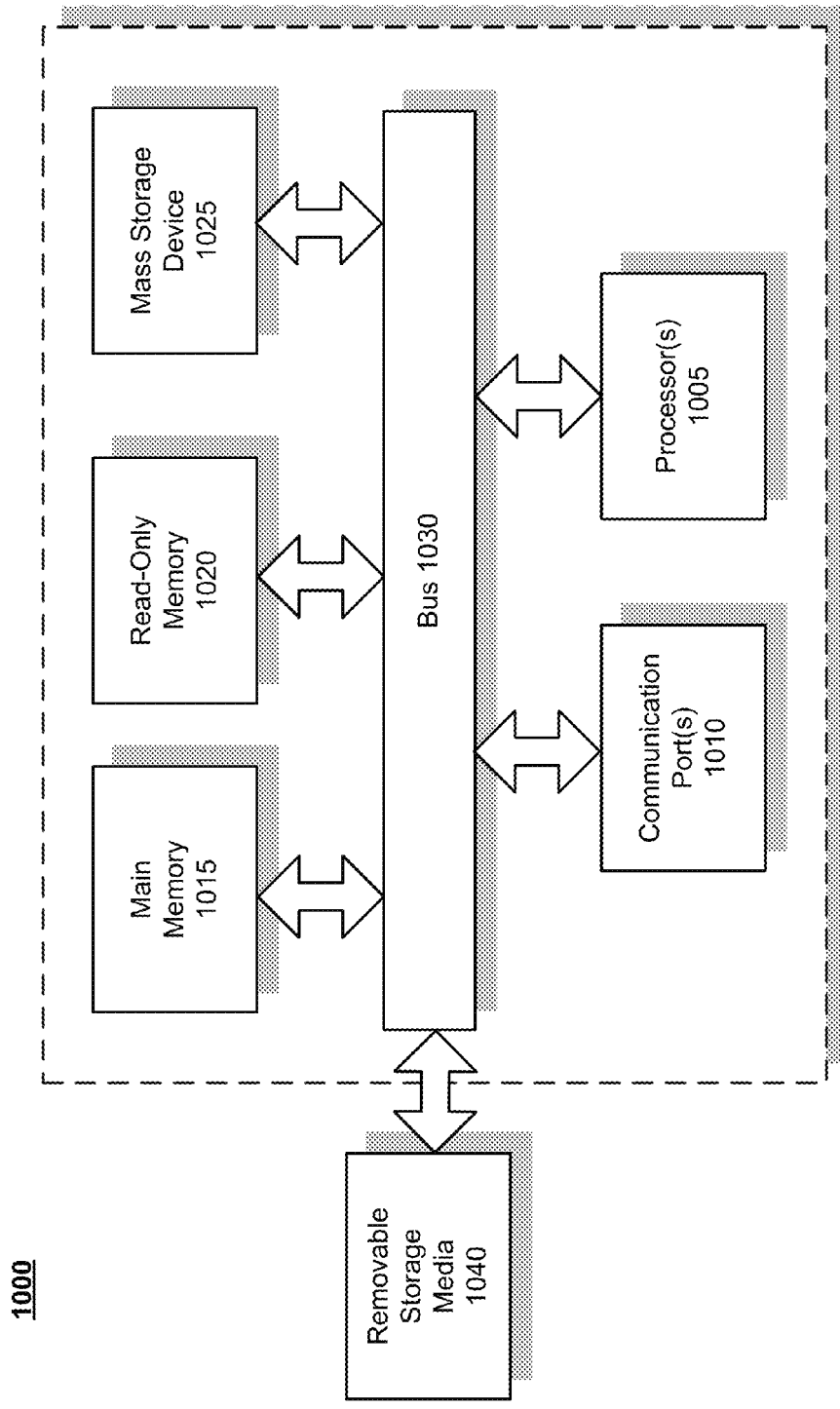
FIG. 10 is an exemplary computer system which may be used in accordance with various embodiments of the present invention.

FIG. 10 is an exemplary computer system which may be used in accordance with various embodiments of the present invention. Embodiments of the present invention include various steps, which have been described above. A variety of these steps may be performed by hardware components or may be tangibly embodied on a computer-readable storage medium in the form of machine-executable instructions, which may be used to cause one or more general-purpose or special-purpose computer processors or microprocessors programmed with instructions to perform these steps. Alternatively, the steps may be performed by a combination of hardware, software, and/or firmware. As such, FIG. 10 is an example of a computer system 1000, such as a workstation, personal computer, laptop, client or server, upon which or with which embodiments of the present invention may be employed.

According to the present example, the computer system includes a bus 1030, one or more processors 1005, one or more communication ports 1010, a main memory 1015, a removable storage media 1040, a read only memory 1020 and a mass storage 1025.

Processor(s) 1005 can be any future or existing processor, including, but not limited to, an Intel® Itanium® or Itanium 2 processor(s), or AMD® Opteron® or Athlon MP® processor(s), or Motorola® lines of processors. Communication port(s) 1010 can be any of an RS-232 port for use with a modem based dialup connection, a 10/100 Ethernet port, a Gigabit port using copper or fiber or other existing or future ports. Communication port(s) 1010 may be chosen depending on a network, such a Local Area Network (LAN), Wide Area Network (WAN), or any network to which the computer system 1000 connects.

Main memory 1015 can be Random Access Memory (RAM), or any other dynamic storage device(s) commonly known in the art. Read only memory 1020 can be any static storage device(s) such as Programmable Read Only Memory (PROM) chips for storing static information such as start-up or BIOS instructions for processor 1005.

Mass storage 1025 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc. According to one embodiment, mass storage 1025 has tangibly embodied thereon instructions, which when executed by processor(s) 1005, cause an instance of the conversational programming agent of FIG. 2 to be instantiated to execute a program at issue, interpret a situation at issue and annotate the program to provide semantic feedback to a programmer as described above.

Bus 1030 communicatively couples processor(s) 1005 with the other memory, storage and communication blocks. Bus 1030 can include a bus, such as a Peripheral Component Interconnect (PCI)/PCI Extended (PCI-X), Small Computer System Interface (SCSI), USB or the like, for connecting expansion cards, drives and other subsystems as well as other buses, such a front side bus (FSB), which connects the processor(s) 1005 to system memory.

Optionally, operator and administrative interfaces, such as a display, keyboard, and a cursor control device, may also be coupled to bus 1030 to support direct operator interaction with computer system 1000. Other operator and administrative interfaces can be provided through network connections connected through communication ports 1010.

Removable storage media 1040 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM).

Components described above are meant only to exemplify various possibilities. In no way should the aforementioned exemplary computer system limit the scope of the invention.

What is claimed is:

1. A method comprising:
    allowing software code associated with one or more of a plurality of programming building blocks to be concurrently edited and executed within a programming environment, including, responsive to advancement of time or input by an end user of the programming environment, revising a current situation relating to the plurality of programming building blocks or revising the software code:
        receiving, by a conversational programming agent of the programming environment, (i) information regarding the plurality of programming building blocks and (ii) information indicative of the current situation; and
        evaluating, by the conversational programming agent, the plurality of programming building blocks based on the current situation;
        responsive to said evaluating, facilitating detection of one or more logical errors in one or more of the plurality of programming building blocks by proactively providing, by the conversational programming agent, real-time, human perceptible semantic feedback regarding those of the plurality of programming building blocks to which the current situation is relevant to the end user based on the evaluating;
    wherein the real-time, human perceptible semantic feedback comprises annotating one or more of the plurality of programming building blocks; and
    wherein the conversational programming agent is implemented in one or more processors and one or more computer-readable media of one or more computer systems, the one or more computer-readable media having instructions tangibly embodied therein that are executable by the one or more processors.

2. The method of claim 1, wherein the real-time, human perceptible semantic feedback comprises colored annotations relating to evaluation of Boolean conditions associated with the one or more of the plurality of programming building blocks.

3. The method of claim 1, wherein the plurality of programming building blocks include operational programming building blocks.

4. The method of claim 1, wherein the plurality of programming building blocks include latent programming building blocks.

5. The method of claim 1, wherein the current situation includes data describing a collection of agents instantiated by an operational program.

6. The method of claim 5, wherein the plurality of programming building blocks include operational programming building blocks of the operational program associated with a selected agent of the collection of agents.

7. The method of claim 1, further comprising concurrently displaying, by the programming environment, (i) a visual representation of a programming building block of the plurality of programming building blocks within a behavior editor and (ii) a visual representation of the current situation, wherein the current situation includes (a) a selection identifying a selected agent of a plurality of agents represented by the plurality of programming building blocks and (b) data describing at least the selected agent and wherein the programming building block corresponds to the selected agent and represents one or more behavioral rules of the selected agent.

8. The method of claim 7, further comprising receiving from the end user via interaction with the visual representation of the current situation, by the programming environment, input regarding a hypothetical situation to be used as the current situation for evaluation by the conversational programming agent.

9. A non-transitory computer-readable storage medium embodying a set of instructions, which when executed by one or more processors of one or more computer systems, cause the one or more processors to perform a method comprising:
    allowing software code associated with one or more of a plurality of a plurality of programming building blocks to be concurrently edited and executed within a programming environment, including, responsive to advancement of time or input by an end user of the programming environment, revising a current situation relating to the plurality of programming building blocks or revising the software code:
        receiving (i) information regarding the plurality of programming building blocks and (ii) information indicative of the current situation; and
        evaluating the plurality of programming building blocks based on the current situation; and
    responsive to said evaluating, facilitating detection of one or more logical errors in one or more of the plurality of programming building blocks by proactively providing real-time, human perceptible semantic feedback regarding those of the plurality of programming building blocks to which the current situation is relevant to the end user based on the evaluating, wherein the real-time, human perceptible semantic feedback comprises annotating one or more of the plurality of programming building blocks.

10. The non-transitory computer-readable storage medium of claim 9, wherein the plurality of colored annotations relate to evaluation of Boolean conditions associated with the one or more of the plurality of programming building blocks.

11. The non-transitory computer-readable storage medium of claim 9, wherein the plurality of programming building blocks include operational programming building blocks.

12. The non-transitory computer-readable storage medium of claim 9, wherein the plurality of programming building blocks include latent programming building blocks.

13. The non-transitory computer-readable storage medium of claim 9, wherein the current situation includes data describing a collection of agents instantiated by an operational program.

14. The non-transitory computer-readable storage medium of claim 13, wherein the plurality of programming building blocks include operational programming building blocks of the operational program associated with a selected agent of the collection of agents.

15. The non-transitory computer-readable storage medium of claim 9, wherein the method further comprises concurrently displaying (i) a visual representation of a programming building block of the plurality of programming building blocks within a behavior editor and (ii) a visual representation of the current situation, wherein the current situation includes (a) a selection identifying a selected agent of a plurality of agents represented by the plurality of programming building blocks and (b) data describing at least the selected agent and wherein the programming building block corresponds to the selected agent and represents one or more behavioral rules of the selected agent.

16. The non-transitory computer-readable storage medium of claim 15, wherein the method further comprises receiving from the end user via interaction with the visual representation of the current situation, by the programming environment, input regarding a hypothetical situation to be used as the current situation for evaluation by the conversational programming agent.

17. A computer-implemented method comprising:
allowing software code associated with one or more of a plurality of programming building blocks to be concurrently edited and executed within a programming environment, including concurrently displaying, by the programming environment, (i) a visual representation of a programming building block of the plurality of programming building blocks within a behavior editor and (ii) a visual representation of a current situation, wherein the current situation includes (a) a selection identifying a selected agent of a plurality of agents represented by the plurality of programming building blocks and (b) data describing at least the selected agent and wherein the programming building block corresponds to the selected agent and represents one or more behavioral rules of the selected agent;

responsive to selection of the selected agent by an end user of the programming environment, a conversational programming agent of the programming environment, evaluating, based on the current situation, the one or more behavior rules and other behavior rules of one or more other of the plurality of agents to which the current situation is relevant; and responsive to said evaluating, facilitating detection of one or more logical errors in the one or more behavior rules by the end user by conveying results of said evaluating, by the conversational programming agent, in a form of one or more annotation to the visual representation of the programming building block, wherein the one or more annotations provide real-time semantic feedback to the end user regarding a meaning of the one or more behavior rules in a context of the current situation.

18. The method of claim 17, wherein the one or more behavior rules comprise Boolean conditions and wherein the one or more annotations comprise colored annotations indicative of truth or falsity of the Boolean conditions.

* * * * *